E. J. DAVIS.
CULTIVATOR.
APPLICATION FILED APR. 1, 1911.
1,014,572.
Patented Jan. 9, 1912.
2 SHEETS—SHEET 1.
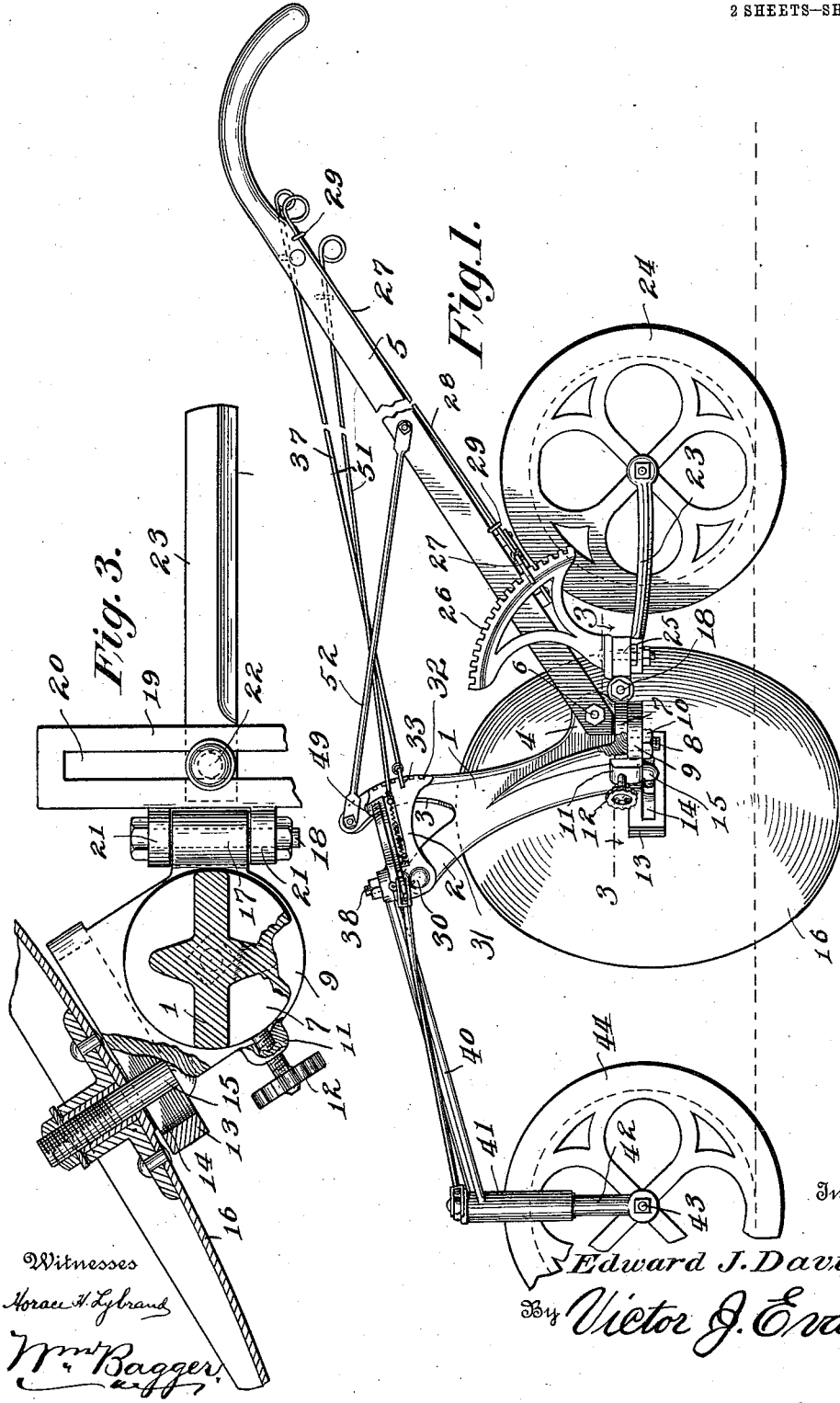
Witnesses
Horace N. Lybrand
Wm. Bagger
Inventor
Edward J. Davis
By Victor J. Evans
Attorney

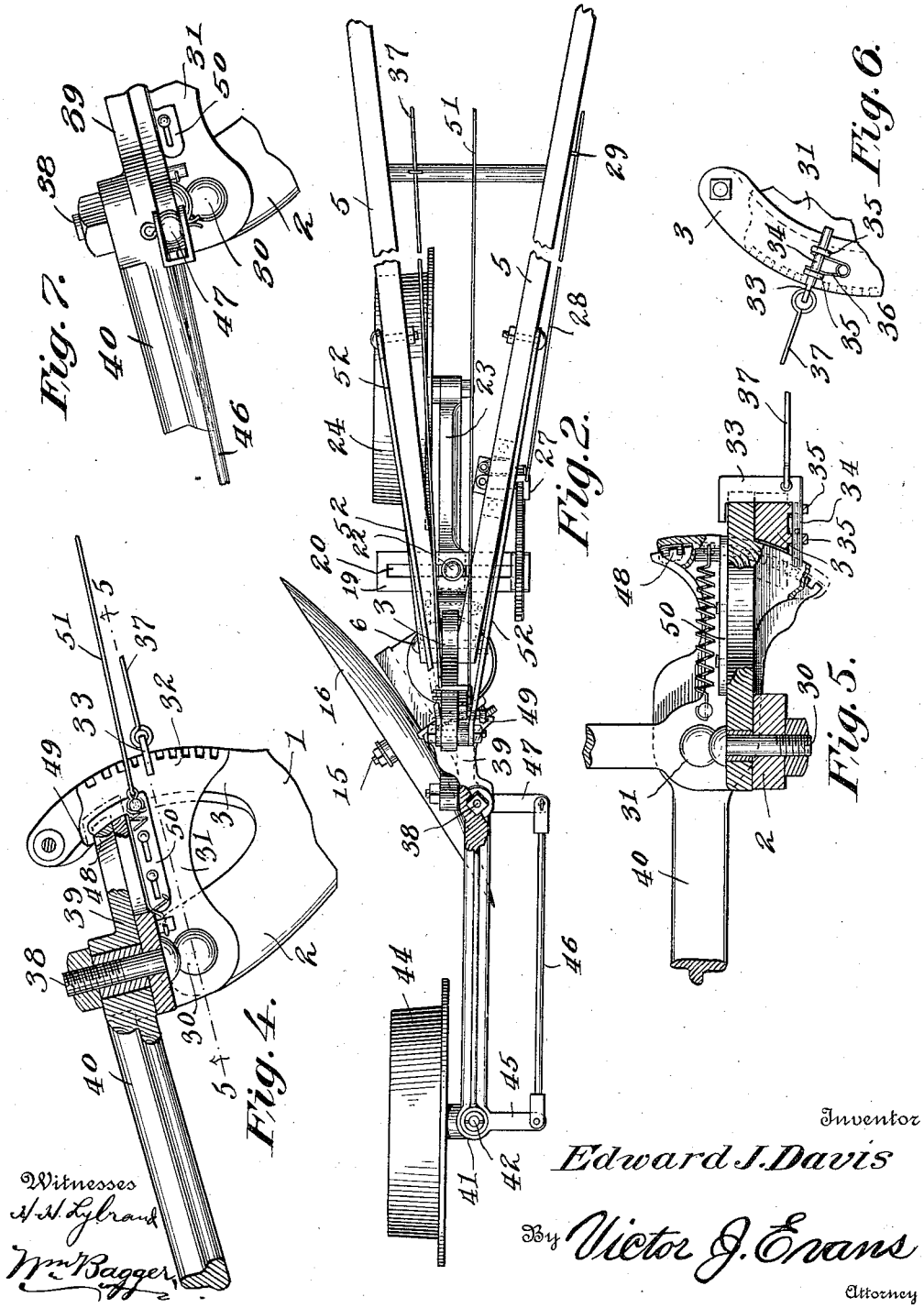

UNITED STATES PATENT OFFICE.

EDWARD J. DAVIS, OF GRENLOCH, NEW JERSEY.

CULTIVATOR.

1,014,572.  Specification of Letters Patent.  Patented Jan. 9, 1912.

Application filed April 1, 1911. Serial No. 618,343.

*To all whom it may concern:*

Be it known that I, EDWARD J. DAVIS, a citizen of the United States, residing at Grenloch, in the county of Camden and State of New Jersey, have invented new and useful Improvements in Cultivators, of which the following is a specification.

This invention relates to hand plows and garden cultivators, and it has for its main object to produce a disk implement of this class which, while easy of propulsion and management, shall be sufficiently heavy to engage the soil at a sufficient depth to render the operation thoroughly effective.

A further object of the invention is to produce a wheeled implement of the class described in which the supporting wheels, as well as the disk implement, shall be capable of every useful adjustment and in which simple and efficient means are provided for retaining the parts in adjusted position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a device constructed in accordance with the invention. Fig. 2 is a top plan view of the same. Fig. 3 is a sectional detail view, enlarged, taken on the line 3—3 in Fig. 1. Fig. 4 is a sectional elevation, enlarged, of the upper portion of the body member of the device and related parts. Fig. 5 is a sectional detail view taken on the line 5—5 in Fig. 4, and looking in an upward direction, as indicated by arrows. Fig. 6 is a detail view in elevation, showing a small portion of the upper end of the body portion of the device, as seen from the opposite side to that exhibited in Fig. 4. Fig. 7 is a detail view in side elevation of the upper forward part of the casting constituting the body portion of the device including the arm 2 and related parts.

Corresponding parts in the several figures are denoted by like characters of reference.

The body portion 1 of the improved implement consists of a casting, the upper end of which is bifurcated to form front and rear arms 2, 3. Near the lower end of the member 1 is formed a rearwardly extending lug or web 4 with which the handles 5, 5 are connected by means of a bolt 6. At the lower end of the member 1 is formed a horizontal circular disk 7 from which an axially disposed pin or bolt 8 extends downwardly to form a pivot upon which a disk or turn table 9 is mounted for rotation, said disk being retained by means of a nut 10 for the reception of which the lower end of the pin 8 is threaded, as shown. The disk or turn table 9 has an upwardly extending lug 11 for the passage of a set screw 12 adapted to engage the edge of the disk 7, thereby maintaining the turn table 9 in adjusted position. The turn table 9 is provided with a depending flange 13 having a longitudinal slot 14 for the passage of a supporting member, such as a bolt 15, which is adjustable in said slot and with which the disk 16 is associated for rotation in any convenient and well known manner. It will be noticed that the bolt 15 may be moved in the slot 14 to provide for longitudinal adjustment of the disk, while by adjustment of the turn table about its axis, the disk may be placed at any desired angle for engagement with the ground.

The body member 1 is provided adjacent to the disk 7 with a rearwardly extending transversely perforated lug 17 for the passage of a pin or bolt 18. A plate 19 having a slot 20 is provided with eyes 21, see Fig. 3, thus connecting the plate 19 hingedly with the body member 1 for movement in a vertical plane. The slot 20 in the plate 19 extends transversely of the machine, and adjustably associated therewith by means of a fastening member, such as a bolt 22, is a rearwardly extending arm 23 carrying the hind wheel 24 which is thus capable of being moved transversely to any desired point for the most effective operation. Connected with the slotted plate 19 by means of a bolt 25 is a rack segment 26, the arc of which is concentric with the axis of the hinge bolt 18. One of the handles of the machine supports a suitably arranged spring slide 27 engaging the rack segment 26, thereby serving to maintain the hinged plate 19 in adjusted position. The slide 27 may be manipulated by means of an operating rod 28 supported in keepers 29 upon the handle and extending within convenient reach of the operator.

Pivotally supported upon the front arm 2 of the body member by means of a pin or bolt 30 is an angle plate 31 having its rear edge notched to form an arcuate rack 32 disposed for movement in a vertical plane and adapted to be engaged by a slide 33. The slide 33 has a pin 34 guided in apertured lugs 35 upon the arm 3 and engaged by a suitably arranged spring 36 whereby it is held in engagement with the arcuate rack 32. The slide 33 is operable by a suitably supported and guided rod 37 that extends within convenient reach of the operator.

Pivotally mounted upon an approximately vertical pin or bolt 38 associated with the angle plate 31 is a plate 39 having a forwardly extending arm 40 carrying at its front end a vertically disposed tubular sleeve 41 wherein a shaft 42 carrying at its lower end a spindle 43 is mounted for rotation, said spindle serving to support the front wheel 44. The shaft 42 carries at its upper end a laterally extending arm 45 which is connected by a link rod 46 with an arm 47 that extends laterally from the angle plate 31. The rear edge of the plate 39, which is arcuate in shape and notched to present a rack bar 48, is guided beneath overhanging lugs 49 of the angle plate 31, and is adapted to be engaged by the spring-actuated slide 50 supported upon said angle plate and adapted to be actuated by means of an operating rod 51 which extends within convenient reach of the operator.

It will be observed that by releasing the slide 33 from engagement with the rack upon the angle plate 31, the latter may be tilted to raise or lower the front wheel 44. By releasing the slide 50 the plate 39 may be turned about its axis for the purpose of effecting lateral adjustment of the wheel, and when the latter adjustment is made, the shaft 42 will be simultaneously oscillated by the link 46 connecting the arms 45 and 47 to keep the wheel straight in the line of progress.

The upper end of the arm 3 of the body member 1 is connected by braces 52 with the handles 5 which are thus braced and reinforced. The front and rear wheels are preferably flanged, as clearly indicated in Fig. 2 of the drawings, thus enabling them to hug the ground and at the same time to prevent lateral displacement of the machine when it is progressing in operation.

The operation and advantages of this invention will be readily understood from the foregoing description taken in connection with the drawings hereto annexed by those skilled in the art to which it appertains.

It will be seen that I have produced a simple and effective cultivating implement which may be utilized for a great variety of purposes in gardening and truck farming. I will have it understood that any desired earth-engaging implement of well known construction may be substituted for the disk herein illustrated.

Having thus described the invention, what is claimed as new, is:—

1. In a garden cultivator, a body member consisting of a casting having upwardly extending front and rear arms, said casting being provided at its lower end with a circular disk and with a rearwardly extending apertured lug and adjacent to its lower end with a transversely apertured web.

2. A body member terminating at its lower end in a circular disk having a downwardly extending axial pin, a turn table supported for rotation upon the pin and having an upwardly extending lug and a downwardly extending slotted flange, a set screw extending through the lug and engaging the disk of the turn table and a disk carrying element adjustably associated with the slotted flange of the turn table.

3. A body member having a rearwardly extending lug and a transversely apertured web, handles connected with the web, a slotted plate having eyes hingedly associated with the lug, a wheel carrying arm adjustably associated with the slotted plate, a rack segment connected with the slotted plate, and a rack engaging slide supported upon one of the handles.

4. A body member, a turn table connected with the lower end thereof and having a downwardly extending slotted flange, a disk carrying member adjustably associated with the said flange, a slotted plate hingedly connected with the body member, a wheel carrying arm adjustably connected with the slotted plate, and means for supporting the latter at various adjustments.

5. A body member having upwardly extending front and rear arms, an angle plate pivotally connected with the front arm, means associated with the rear arm for supporting the angle plate at various adjustments, a member pivotally associated with the angle plate and having a forwardly extending wheel carrying arm, and means for securing the member having the wheel carrying arm at various adjustments with reference to the angle plate.

6. A body member having upwardly extending front and rear arms, an angle plate pivotally associated with the front arm for movement in a vertical plane, a member pivotally associated with the angle plate for movement in a plane approximately at right angles to the plane of movement of the angle plate, means for retaining the angle plate and the pivoted member at various adjustments, an arm extending forwardly from the pivoted plate and having a terminal sleeve, a wheel carrying shaft supported for rotation in the sleeve and having a laterally extending arm, an arm extending laterally from the angle plate, and a link rod connecting the latter arm with the arm extending from the wheel carrying shaft.

7. In a garden cultivator, a body member, a turn table connected with the lower end thereof, a cultivating disk adjustably associated with the turn table, a plate hingedly associated with the body member near the lower end thereof, a wheel carrying arm adjustably connected with said plate, an angle plate pivotally connected with the body member near the upper end thereof, a plate pivotally associated with the angle plate and having a forwardly extending arm provided with a terminal vertically disposed sleeve, a wheel carrying shaft supported for oscillation in the sleeve, means for changing the angle of the wheel to present it straight in the line of draft when the pivoted plate having the wheel carrying arm is adjusted about its axis, and means for supporting the adjustable parts of the device at various adjustments.

In testimony whereof I affix my signature in presence of two witnesses.

EDWARD J. DAVIS.

Witnesses:
ELBERT BRADSHAW,
IDA M. DAVIS.

---

Copies of this patent may be obtained for five cents each, by addressing the "Commissioner of Patents, Washington, D. C."